United States Patent
Grossin et al.

(10) Patent No.: US 10,255,553 B2
(45) Date of Patent: Apr. 9, 2019

(54) ESTIMATION OF A DELETED FLUID CONSUMPTION

(71) Applicant: ELECTRICITE DE FRANCE, Paris (FR)

(72) Inventors: Benoit Grossin, Rueil Malmaison (FR); Philippe Charpentier, Mareil-Marly (FR); Leslie Hatton, Paris (FR); Eric Matzner-Lober, Saint Martin de Londres (FR)

(73) Assignee: ELECTRICITE DE FRANCE, Paris (FR)

( * ) Notice: Subject to any disclaimer, the term of this patent is extended or adjusted under 35 U.S.C. 154(b) by 682 days.

(21) Appl. No.: 14/893,567

(22) PCT Filed: May 23, 2014

(86) PCT No.: PCT/FR2014/051217
§ 371 (c)(1),
(2) Date: Nov. 24, 2015

(87) PCT Pub. No.: WO2014/188140
PCT Pub. Date: Nov. 27, 2014

(65) Prior Publication Data
US 2016/0132782 A1 May 12, 2016

(30) Foreign Application Priority Data
May 24, 2013 (FR) .................................. 13 54694

(51) Int. Cl.
*G06N 7/00* (2006.01)
*G06N 99/00* (2010.01)
(Continued)

(52) U.S. Cl.
CPC .............. *G06N 7/00* (2013.01); *G06N 99/005* (2013.01); *G06Q 10/06* (2013.01); *G06Q 50/06* (2013.01)

(58) Field of Classification Search
USPC .......................................................... 706/12
See application file for complete search history.

(56) References Cited

U.S. PATENT DOCUMENTS 5,757,664 A * 5/1998 Rogers ................ G01F 23/0069
700/232
7,036,559 B2 * 5/2006 Stanimirovic ....... F24F 11/0086
165/11.1
(Continued)

FOREIGN PATENT DOCUMENTS

EP  2 458 703 A2   5/2012
JP  2005-237187 A  9/2005
(Continued)

OTHER PUBLICATIONS

ScienceDirect Elsevier Comparison between detailed model simulation and artificial neural network for forecasting building energy consumption, Alberto Hernandez Neto, Flávio Augusto Sanzovo Fiorelli, University of Sao Paulo, Brazil, Mechanical Engineering DepartmentEnergy and Buildings vol. 40, Issue 12, 2008, pp. 2169-2176.*
(Continued)

*Primary Examiner* — Michael B Holmes
(74) *Attorney, Agent, or Firm* — Drinker Biddle & Reath LLP (57) ABSTRACT

A device for estimating a deleted fluid consumption during a deletion phase, where said device comprises: a collection module configured to collect: a) first consumption data comprising information about the consumption of fluid from n fluid meters coming from a first group, and b) second consumption data comprising information about the con-
(Continued)

sumption of fluid from m fluid meters coming from a second group, a computer analysis module which is configured for calculating, as a function of the first and second consumption data weighting coefficients $\beta_i$ minimizing the distance between the fluid consumptions of the first and second groups, where i is a positive integer included between 1 and m.

17 Claims, 4 Drawing Sheets

(51) Int. Cl.
  *G06Q 10/06* (2012.01)
  *G06Q 50/06* (2012.01)

(56) References Cited

U.S. PATENT DOCUMENTS

| | | | | |
|---|---|---|---|---|
| 7,107,838 | B2* | 9/2006 | Chai | C02F 1/003 73/290 R |
| 7,243,050 | B2* | 7/2007 | Armstrong | G05D 22/02 702/188 |
| 7,341,201 | B2* | 3/2008 | Stanimirovic | F24F 11/0086 236/49.1 |
| 7,668,694 | B2* | 2/2010 | Anderson | E21B 47/042 700/281 |
| 7,818,092 | B2* | 10/2010 | Lovell | G01F 1/007 700/282 |
| 7,869,978 | B2* | 1/2011 | Anderson | E21B 47/042 415/17 |
| 8,483,998 | B2* | 7/2013 | Lovell | G01F 1/007 703/2 |
| 8,531,047 | B2* | 9/2013 | Schmidt | F03G 7/08 290/1 R |
| 9,814,426 | B2* | 11/2017 | Connor | A61B 5/0476 |
| 2007/0169564 | A1* | 7/2007 | Lovell | G01F 1/007 73/861.42 |
| 2011/0007862 | A1* | 1/2011 | Schmidt | F03G 7/00 377/15 |
| 2011/0071688 | A1* | 3/2011 | Lovell | G01F 1/007 700/282 |
| 2011/0074601 | A1* | 3/2011 | Cornwall | G01D 4/004 340/870.02 |
| 2011/0154911 | A1* | 6/2011 | Ge | G01F 1/28 73/861.11 |
| 2013/0110299 | A1 | 5/2013 | Meyerhofer et al. | |
| 2014/0183386 | A1* | 7/2014 | Ravid | G06F 17/00 251/129.01 |
| 2015/0313496 | A1* | 11/2015 | Connor | A61B 5/0476 600/301 |
| 2016/0132782 | A1* | 5/2016 | Grossin | G06Q 10/06 706/12 |
| 2016/0314400 | A1* | 10/2016 | Charpentier | G06Q 10/04 |

FOREIGN PATENT DOCUMENTS

| | | |
|---|---|---|
| WO | 02/27639 A1 | 4/2002 |
| WO | 2008/017754 A2 | 2/2008 |

OTHER PUBLICATIONS

ScienceDirect Elsevier Determination of daily evaporation and evapotranspiration of winter wheat and maize by large-scale weighing lysimeter and micro-lysimeter Changming Liu Xiying Zhang Yongqiang Zhang Agricultural and Forest Meteorology vol. 111, Issue 2, Apr. 30, 2002, pp. 109-120.*
ScienceDirect Elsevier Environmental Kuznets curves-real progress or passing the buck?: A case for consumption-based approaches Dale SRothman Ecological Economics Ecological Economics vol. 25, Issue 2, May 1998, pp. 177-194vol. 25, Issue 2, May 1998, pp. 177-194.*
ScienceDirect Elsevier a simple respirometric technique for assessing compost stability Katia E.Lasaridi, Ed I.Stentiford Water Research vol. 32, Issue 12, Dec. 1998, pp. 3717-3723.*
A knowledge management system based on artificial intelligence (AI) methods: A flexible fuzzy regression-analysis of variance algorithm for natural gas consumption estimation Morteza Saberi; Ali Azadeh; Zahra Saberi; Peiman Pazhoheshfar 2012 International Conference on Information Retrieval & Knowledge Management pp. 143-147 IEEE Conferences.*
ScienceDirect Elsevier Water Research vol. 39, Issue 20, Dec. 2005, pp. 4993-5004, Selective removal of arsenate from drinking water using a polymeric ligand exchanger, Byungryul An, Thomas R. Steinwinder, Dongye Zhao.*
ScienceDirect Elsevier Chemosphere vol. 73, Issue 9, Nov. 2008, pp. 1393-1400, Treatment of fluoride containing drinking water by electrocoagulation using monopolar and bipolar electrode connections, D. Ghosh, C.R. Medhi, M.K. Purkait.*
ScienceDirect Elsevier Chemical Geology vol. 421, Feb. 10, 2016, pp. 65-80, The impact of evolving mineral-water-gas interfacial areas on mineral-fluid reaction rates in unsaturated porous media, Anna L. Harrison, Gregory M. Dipple, Ian M. Power, K. Ulrich Mayer.*
Office Action issued in related application JP 2016-514468, dated Jan. 10, 2017, with English language translation, 6 pages.
AEIC Load Research Committee, "Demand Response Measurement & Verification—Applications for Load Research", AEIC Whitepaper, Mar. 2009, <http://www.aeic.org/load_research/AEIC-MV-Whitepaper-030409.pdf>, 30 pages.
Anonymous, "Scientific Programme of WIPFOR 13", WIPFOR 13 workshop, Jun. 5-7, 2013, <http://www.conferences-osiris.org/sites/default/files/SCIENTIFIC%20PROGRAM_Definitif.pdf>, 3 pages.
Brown et al., "Kernel regression for real-time building energy analysis", Journal of Building Performance Simulation, vol. 5, No. 4, Jul. 2012, pp. 263-276.
Hatton, "Measuring residential counterfactual load", Abstract of a presentation at WIPFOR 13 workshop, Jun. 5-7, 2013, <http://www.conferences-osiris.org/wipfor/13abstract-page/287>, 1 page.
Heshmati, "Survey of models on demand, customer base-line and demand response and their relationship in the power market", Discussion Paper series, Forschungsinstitut zur Zukunft der Arbeit, No. 6637, 2012, <https://www.econstor.eu/dspace/bitstream/10419/62559/1/717990001.pdf>, 64 pages.
Navigant Consulting, "EM&V Report for the Residential Energy Efficiency Benchmarking Program—Program Year 1", Navigant Consulting Report presented to Progress Energy Carolinas, Dec. 21, 2012, <http://dms.psc.sc.gov/pdf/matters/DED5D3CE-155D-141F-1D3D7AD1967BECD1.pdf>, 84 pages.
Navigant Consulting, "Evaluation Report: Home Energy Reports—Plan Year 4", Navigant Consulting report presented to Commonwealth Edison Company, Mar. 4, 2013, <http://ilsagfiles.org/SAG_files/Evaluation_Documents/ComEd/ComEd EPY4 Evaluation Reports/ComEd_Home_Energy_Reports_EPY4_Eva1_Report-Final.pdf>, 34 pages.
Southern California Edison Company, "Compliance filing of Southern California Edison Company (U 338-E) pursuant to decision 08-09-039", Document submitted to the Public Utilities Commission of the State of California, Apr. 30, 2012, <https://www.pge.com/regulation/DemandResponseOIR/Pleadings/SCE/2012/DemandResponseOIR_Plea_SCE_20120430_237124.pdf>, 96 pages.
Stuart, "Matching Methods for Causal Inference: A Review and a Look Forward", Statistical Science, vol. 25, No. 1, Feb. 2010, pp. 1-21.
Van Der Kooij, "Chapter 4—Regularization with Ridge penalties, the Lasso, and the Elastic Net for Regression with Optimal Scaling Transformations" In: "Prediction accuracy and stability of regression with optimal scaling transformations, PhD Thesis, Leiden University", 2007, pp. 65-90.
Van Der Kooij, "Prediction accuracy and stability of regression with optimal scaling transformations", PhD thesis, Leiden University, <https://openaccess:leidenuniv.nl/handle/1887/12096>, retrieved from internet on Oct. 31, 2014, 7 pages.
Violette et al., "Estimating net energy savings (Third draft, Apr. 11, 2013)", Draft Protocol, Uniform Uniform Methods Project, NREL, (56) References Cited

OTHER PUBLICATIONS

Nov. 6, 2013, <http://www.nrel.gov/extranet/ump/pdfs/20131106_net_savings_chapter.pdf>, 72 pages.

* cited by examiner

ESTIMATION OF A DELETED FLUID CONSUMPTION

CROSS-REFERENCE TO RELATED APPLICATIONS

This application is the U.S. national phase of the International Patent Application No. PCT/FR2014/051217 filed May 23, 2014, which claims the benefit of French Application No. 13 54694 filed May 24, 2013, the entire content of which is incorporated herein by reference.

FIELD

The subject matter of the present invention deals with the domain of management of fluid consumption; more specifically the subject of the present invention relates to the reduction of fluid consumption.

One of the objectives of the present invention is to estimate precisely the quantity of fluid that a facility (domestic or industrial) would have consumed if it had not been deleted during a phase called deletion.

The present invention thus has many advantageous applications, for example for energy operators by allowing them to manage in real time and with optimization their production of fluid in order in particular to provide a balance between fluid supply and demand.

The present invention also has other advantageous applications in particular for adjustment operators by allowing them to precisely quantify the consumption of deleted fluid during a period of deletion.

In the meaning of the present invention, fluid must be understood here throughout the present description which follows as any energy source, such as for example electricity, water or even gas or fuel oil which could be consumed by equipment from a facility (domestic or industrial) in particular in order for operation thereof.

BACKGROUND

Managing fluid consumption has become a daily and growing challenge for both individuals and industrials: the reasons motivating management of this consumption are both economic (e.g. high financial costs) and ecological (e.g. pollution, greenhouse gas emission, management of natural resources).

In order to manage this consumption, energy operators have for several years implemented effective energy policies aiming to reduce fluid consumption, especially during periods of peak consumption.

Among individuals, this peak consumption occurs most often in the winter between 6 and 8 p.m., which is in particular explained by climatic conditions at that time of year and conventional domestic uses.

Generally this peak energy fluid consumption is satisfied by "rapid" production means; however, these means are very often polluting.

Thus, for example, for electric energy production, combustion turbines are used.

In the electric energy field, in order to limit this increased consumption during such a peak, tariffs have been used for motivation for several decades.

Most electric energy suppliers have been fact established specific tariffs for hours referred to as "peak" and "off-peak": the price of electricity is thus increased for a fixed time slot in order to reduce or delay demand.

Other solutions are now implemented to better manage this consumption; energy operators have in fact established a heightened policy in the area of Active Demand Management (also known under the acronym ADM); the purpose of this management is to control and reduce energy fluid consumption both on the residential market and the industrial market.

Among these solutions, one of them consists of directly controlling the electrical load of some equipment.

Thus, some electric usages such as heating and/or sanitary hot water can be interrupted at times of high demand for example for two hours (preferably between 6 and 8 p.m.).

During these times of electric consumption reduction, it is said that the client "deletes", since the client had obviously previously voluntarily subscribed to a deletion service (very often by receiving preferential tariffs in exchange).

These load control means are generally only activated a few days per year (15 to 20 days) during the winter and are used to significantly reduce fluid consumption and the final bill to the consumer.

It is therefore crucial to precisely estimate this deleted fluid quantity, also called "deletion." This deleted quantity of fluid therefore corresponds to the difference between the quantity of fluid actually consumed and the quantity of fluid which would've been consumed if the client had not deleted; this theoretical quantity is also called "baseline."

This estimate of the deleted quantity of fluid, or deletion, is even more strategic since it is now possible to benefit from this deletion: there are in fact adjustment operators who contractually agree to sell deletion for example every half hour over a set time interval in order to enable a regulation of the fluid consumption and possibly sell the energy to other operators during these peaks to meet the demand.

Faced with this new problem, many methods have been proposed for calculating this deletion by estimating the "baseline" (also called counterfactual or non-consumption): the precision of these various deletion estimation methods therefore depends on the precision with which the "baseline" is estimated.

A first approach relies on observing the electric power before and after the deletion phase and proposing a linear interpolation of the actual consumption between the beginning and end of deletion Such an approach is described in particular in the document WO 2008/017754.

This first approach mainly has two disadvantages.

First, this approach implicitly assumes the consumer behavior between the beginning and end of the deletion is linear; such a working hypothesis is not correct and studies done by the Applicant have clearly shown that the implementation of methods based on this approach inevitably leads to an over- or under-estimation of the "baseline", and therefore of the deleted fluid quantity.

Second, an anticipation effect before the beginning of deletion (i.e. artificial increase of consumption) and a rebound effect after the end of deletion (i.e. technical increase due to a catch-up effect, in particular of heating) is systematically observed on the consumption curves.

Therefore, by estimating the "baseline" according to the first approach, the estimation and rebound effects inevitably lead to an accentuation of the estimation error.

Such approximations for estimating the "baseline" are unacceptable, in particular if the estimated deletion finally leads to a payment.

A second approach consists of estimating the "baseline" by the average load curve for a group of clients, called control or witness group.

For this approach to work, the clients from the control group cannot be deleting.

All the same, such an approach is not error-free, because there is necessarily a bias between the control group and the group of clients, called deleting, who subscribed to the deletion service.

In fact, subscribing to a deletion service inevitably implies that the client is concerned about the environment and/or controlling expenses.

This approach does not seek therefore to build a control group comparable to the group of clients who subscribed to the deletion service and therefore having similar behaviors in terms of consumption, in particular during deletion phases.

The control group is chosen randomly among the sample group of clients who did not subscribe to the deletion service.

Theoretically, it is possible to conceive of the construction of a control group comparable to the group of clients having subscribed to the deletion service by randomly selecting clients for the control group from this group of deletion clients.

Nonetheless, such a solution cannot be validly implemented in practice, in particular for reasons of cost and averages. In fact, the clients having subscribed to the deletion service are all called on and subscribe to the deletion process; it is therefore impossible to set aside a portion of these clients to build a control group.

The technical document, *Navigant Consulting: "Evaluation Report: Home Energy Reports—Plan Year 4"*, which describes in detail an approach similar to the one above, is known from the state-of-the-art.

In fact, in this document, the recruited clients are randomly assigned to the control group or to the group of deleted clients.

This approach is consistent from a theoretical perspective; however, in actual operation, this approach is not workable.

First, as mentioned above, it is not possible to randomly distribute a client who subscribed to a deletion offer: a client who has subscribed to the deletion service cannot be blocked from not deleting in order to build the control group. Similarly, it is not conceivable to force a client to delete if they do not want to subscribe to the service. With this approach, the results obtained would be strongly biased.

Second, such an approach requires too much processing time: at least two seasons are needed. in fact, in order to provide relatively stable results and show effective similarities, the approach requires measurements over at least two consecutive seasons: a first season in order to verify that the samples measured for each group are similar and a second season for measuring the deletions.

Thus, the construction of the control group proposed in this document is only usable as part of an experiment; this approach is unusable operationally when a control group has to be created dynamically and the deletion determined in real time in particular for the readjustment market.

At this time, there is no effective method in the state-of-the-art for building a relevant control group.

SUMMARY

The purpose of the present invention is to improve the situation described above.

Thus, one of the objectives of the present invention is to enable construction of a control group having a behavior comparable to the group of clients who subscribed to a deletion service in order to estimate precisely and in real time a quantity of fluid consumption deleted during the deletion phase.

Another objective of the present invention is to enable construction of a flexible and adaptable control group which can be applied to other groups in order to calculate other deletions.

For this purpose, the subject matter of the present invention covers a method for estimating a deleted fluid consumption during a deletion phase. Preferably, this estimate will be done in real time or a posteriori (meaning after deletion)

According to the present invention, the estimation method is implemented by computer means and comprises during a learning phase:
  a first collection step which consists of collecting first consumption data comprising information about the consumption of fluid from n fluid meters coming from a first group, where n is a positive integer, and
  a second collection step which consists of collecting second consumption data comprising information about the consumption of fluid from m fluid meters coming from a second group, where m is a positive integer.

This data collection is done continuously or periodically.

Preferably, m is strictly greater than n. This way it is possible to get more precise results.

Advantageously, the n fluid meters from the first group have subscribed to a deletion service, and the m meters from the second group have not subscribed to a deletion service.

According to the invention, the estimation method next comprises a step of analysis of the first and second collected consumption data.

During this step, weighting coefficients (where i is a positive integer included between 1 and m) are calculated as a function of this consumption data so as to minimize the distance between the fluid consumption of the first and second groups.

During the learning phase, the method according to the present invention comprises furthermore a determination step during which a control group is determined from the second consumption data coming from m fluid meters from the second group and as a function of the weighting coefficients calculated during the analysis step.

Advantageously, the method according to the invention comprises, during a set deletion phase, an estimation step that consists of estimating in real time the deleted fluid consumption by calculating the difference between the fluid consumption of the control group and the average fluid consumption of the n fluid meters from the first group.

Because of this succession of technical steps, characteristic of the present invention, it is possible to collect remotely and in real time consumption data coming from fluid meters linked to facilities (domestic and/or industrial) and to calculate (in real time or a posteriori) weighting coefficients as a function of these data.

The calculation of weighting coefficients is characteristic of the present invention. In fact, with these coefficients it is going to be possible to quickly and precisely construct a control group comparable to a group of fluid meters having subscribed to a deletion service. Thus, according to the invention, the control group is not built randomly, contrary to the state-of-the-art mentioned in the introduction.

According to the invention, the control group appears as a linear combination of the individual fluid consumption from the fluid meters of the second group that best approaches the average fluid consumption during the learning phase of the fluid meters from the first group.

Because of this control group, it is thus possible to estimate in real time and precisely the deleted fluid consumption during a deletion phase and this is done by observing the fluid consumption of the control group.

The present invention thus applies to estimating the deleted fluid quantity during any type of deletion (by direct control of the load or any other deletion type like for example a voluntary and one time deletion by a client for example to reduce their bill).

Preferably, the learning phase comes before the deletion phase.

In an advantageous variant, the weighting coefficients are calculated during the analysis step so as to solve the following equation:

$$\underset{\beta_1 \ldots \beta_m}{\mathrm{argmin}}\left(dist\left(\overline{P_1}(t) - \sum_{j=1}^{m}\beta_j P_{2,j}(t)\right)\right)$$

in which:

$P_{2,j}(t)$ is the individual fluid consumption during the learning phase of the fluid meter j belonging to the second group, and $\overline{P_1}(t)$ is the average fluid consumption during the learning phase of the n fluid meters from the first group.

Preferably, the fluid consumption is an electric power representative of the electric power consumed; this fluid consumption can also be representative of the consumed energy.

The present invention provides for various embodiments for calculating the weighting coefficients $\beta_i$ during the analysis step.

In a first embodiment, the calculation of weighting coefficients $\beta_i$ comprises a sequential selection of fluid meters from the second group minimizing the distance between the fluid consumptions of the first and second groups.

Preferably, a value of "1" is assigned to the weighting coefficient $\beta_k$ if the fluid consumption from the fluid meter k from the second group is selected and otherwise a value of "0" is assigned, where k here is a positive integer included between 1 and m.

This algorithm is called sequential selection and is easy to implement.

Furthermore, this algorithm assigns a weight of "1" to the fluid meter from the second group if it is selected, which is operationally meaningful in particular when m is of size m>>n.

In this embodiment, the step of determining the control group comprises the calculation of the average fluid consumption of the second group as a function of the weighting coefficients, where such a calculation is preferably done according to the following mathematical formula:

$$\overline{P_2}(t) = \frac{1}{\sum_{j=1}^{m}\beta_j}\sum_{j=1}^{m}\beta_j P_{2,j}(t)$$

in which $P_{2,j}(t)$ is the individual fluid consumption during the learning phase of the fluid meter j belonging to the second group.

Preferably, the fluid consumption is an electric power representative of the electric power consumed; the load curve of a client is also discussed; this fluid consumption can also be representative of the consumed energy.

In a second embodiment, the calculation of weighting coefficients $\beta_i$ comprises a linear regression, preferably constrained, of the average fluid consumption of n fluid meters from the first group over the individual fluid consumption of each of the m fluid meters of the second.

Here constrained linear regression is understood to mean a linear regression introducing a constraint on the norm of the coefficients of the model of type:

$\|\beta\|\leq\delta, \beta\in R^m$ with $\beta=(\beta_0, \ldots \beta_m)$ $\|\cdot\|$ a type L1, L2 or other norm $\beta$ is the vector of the parameters of the m+1 coefficients (one coefficient for the constant+one coefficient per variable (clients included in the control group)).

Here the variable corresponds to the load curve of one client.

Such a constrained linear regression can be done according to several approaches.

According to a first approach, the constrained linear regression is the Ridge type.

According to a second approach, the constrained linear regression is the Lasso type.

In an advantageous sub-variant it is also possible to use a positive Lasso type constrained linear regression.

Alternatively, it can be a PLS, Positive Least-Squares, or PCR, Principal Components Regression, type linear regression.

The various linear regressions proposed above all have in particular the advantage of:

always having the control group closest to the deleted client group even if the latter changes over time (e.g. new clients, lost clients), because the estimate from the model is based on a short history;

allowing a network operator to follow the deletion in real time and be able to act in case of imbalance of the electric system by an increase/reduction of the number of deleted clients or by stopping/starting production means.

assuring an adjustment operator that it fully meets its deletion contract and being able to act by increasing or reducing the number of deleted clients in case of noncompliance with the deletion contract.

checking the execution of deletions at 10-minute or 30-minute steps over the markets making use of deletion.

When the weighting coefficients are calculated using a linear regression, the step of determining the control group comprises the calculation of the average fluid consumption of the second group as a function of the weighting coefficients, where such a calculation is preferably done according to the following mathematical formula:

$$\overline{P_2}(t) = \sum_{j=1}^{m}\beta_j P_{2,j}(t)$$

in which $P_{2,j}(t)$ is the individual fluid consumption during the learning phase of the fluid meter j belonging to the second group.

In a related manner, the subject matter of the present invention covers a computer program which comprises instructions suited for the execution of the steps of the estimation method as described above and does so in particular when said computer program is executed by at least one processor.

Such a computer program can use any programming language and be in the form of source code, object code or an intermediate code between source code and object code, such as partially compiled form, or in any other desirable form.

Similarly, the subject of the present invention covers a computer readable recording medium on which a computer program is recorded comprising instructions for execution of the method steps as described above.

Additionally, the recording medium can be any entity or device capable of storing the program. For example, the medium can comprise a storage means, such as a ROM memory, for example a CD ROM or a microelectronic circuit type ROM memory, or even a magnetic recording means, for example a floppy disk type diskette or a hard drive.

Additionally, this recording medium can also be a transmittable medium such as electrical or optical signal, were such a signal can be routed by electrical or optical cable, conventional or line-of-sight radio or by autotargeting laser beam or by any other means. The computer program according to the invention can in particular be downloaded over an Internet type network.

Alternatively, the recording medium can be an integrated circuit in which the computer program is incorporated, where the integrated circuit is suited for executing or for being used in the execution of the method in question.

The subject matter of the present invention covers a device for estimating a deleted fluid consumption during a deletion phase.

For this purpose, the estimation device according to the present invention comprises computer means configured for implementing steps from the estimation method as described above.

More precisely, the estimation device comprises a collection module configured for collecting:

a) first consumption data comprising information about the consumption of fluid from n fluid meters coming from a first group, where n is a positive integer and where said n fluid meters from the first group have subscribed to a deletion service; and b) second consumption data comprising information about the consumption of fluid from m fluid meters coming from a second group, where m is a positive integer and where said m fluid meters from the second group have not subscribed to a deletion service.

Advantageously the estimation device furthermore comprises:

- a computer analysis module, or calculator, which is configured for calculating, as a function of the first and second consumption data, weighting coefficients $\beta_i$ minimizing the distance between the fluid consumption of the first and second groups, where i is a positive integer included between 1 and m;
- a processor configured to determine a control group from the second consumption data collected coming from m fluid meters from the second group and from said weighting coefficients $\beta_i$ calculated by the analysis computer module; and
- an estimation computer module configured for estimating the deleted fluid consumption during a deletion phase by calculating the difference between the fluid consumption of the control group and the average fluid consumption of the n fluid meters from the first group.

By these various functional and structural aspects described above, the present invention serves to estimate in real time (or a posteriori) and precisely the deleted fluid consumption quantity during the deletion phase, where the present invention applies for any type of deletion (deletion by direct control of the load or voluntary deletion by the client).

BRIEF DESCRIPTION OF THE DRAWINGS

Others features and advantages of the present invention will emerge from the following description, with reference to attached FIGS. 1 to 3 which illustrate a sample implementation thereof without any limitation and in which.

DETAILED DESCRIPTION

Figure 2:
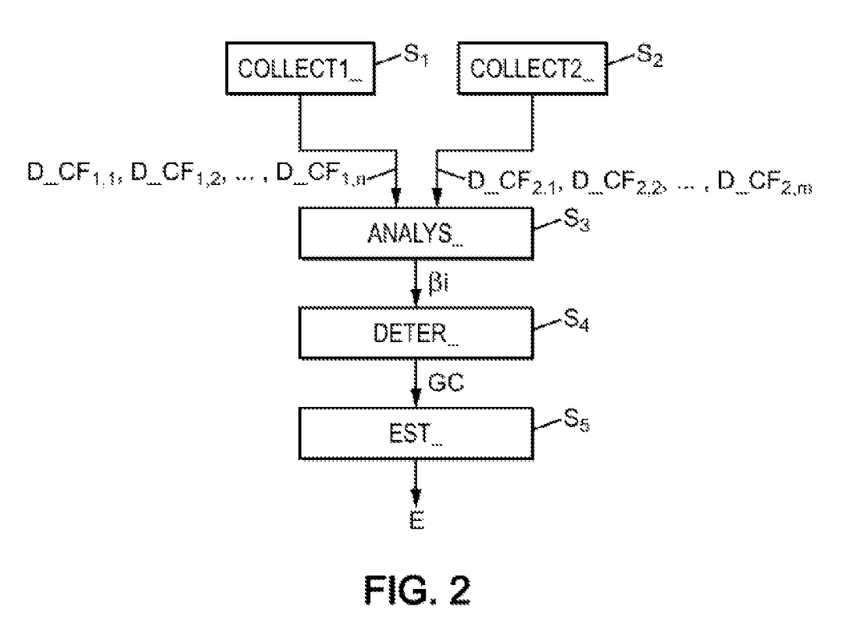
FIG. 2 shows a block diagram including the various execution steps according to a sample implementation of the method from the invention.
Figure 3A:
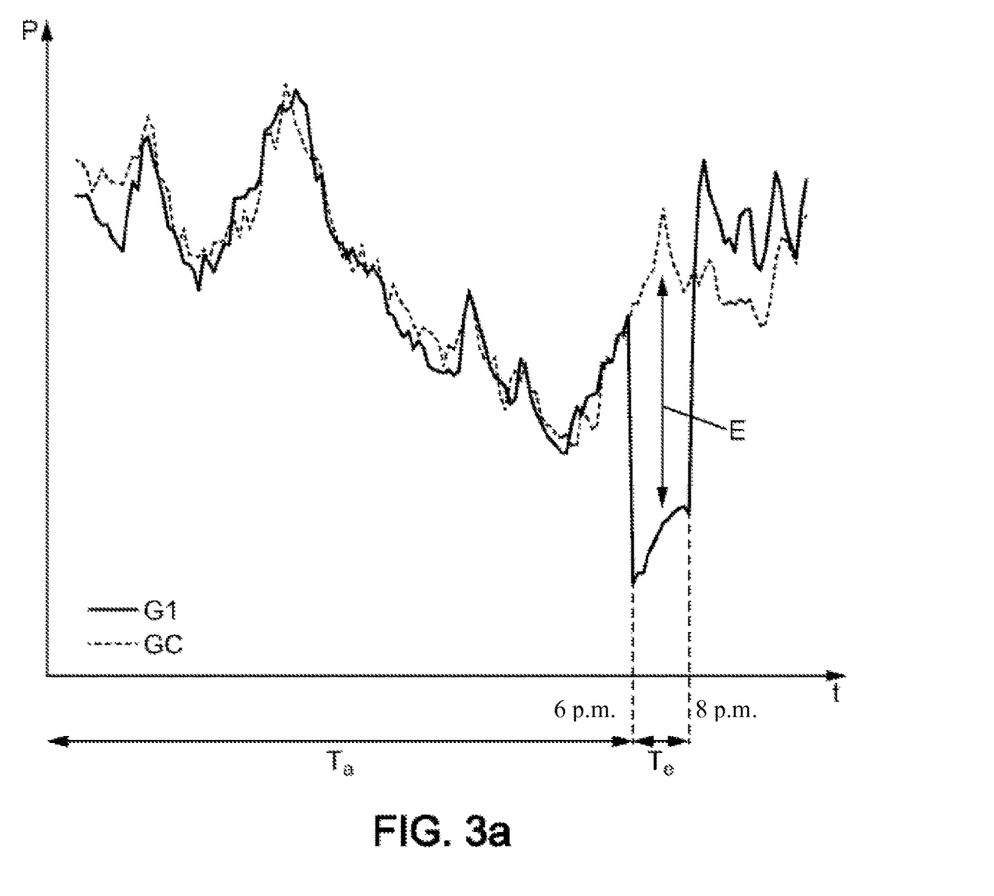
FIG. 3a is a chart showing the variation over one day of the average fluid consumption from the first group of fluid meters and that from the control, when deletion is in effect between 6 and 8 p.m.
Figure 3B:
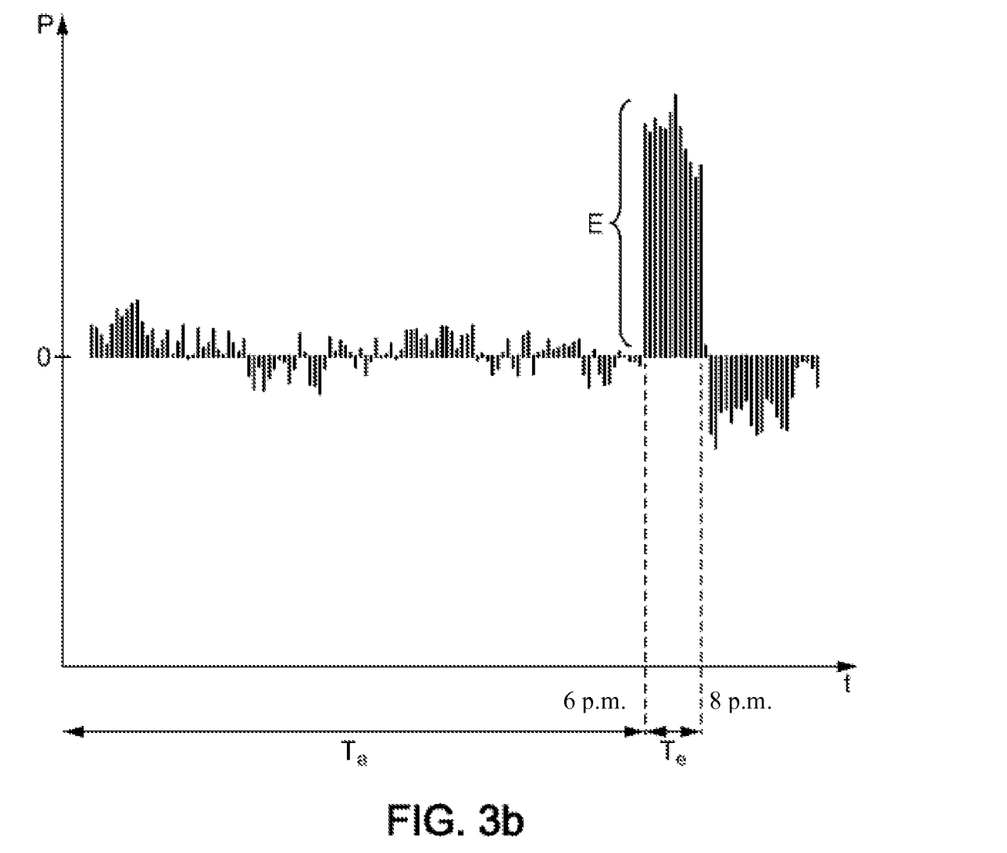
FIG. 3b is a graphic representation of an estimation of the deletion between 6 and 8 p.m. when the deletion service is in effect.

A method for estimating a deleted fluid consumption E and also the associated device 100 are now going to be described in the following by jointly referring to FIGS. 1 to 3.

Recall, during a deletion phase Te, it is not possible to directly measure the deleted fluid consumption E (illustrated in FIGS. 3a and 3b) of a first group G1 of n fluid meters $CF_{1,1}$, $CF_{1,2}$, $CF_{1,2}$ that have subscribed to a deletion service.

In fact, such a deletion value E is not measurable because it is purely fictional and theoretical.

As explained above, estimating this deleted fluid consumption E just the same represents a strategic issue for the energy activity players.

The approaches proposed until now are unsatisfactory: They remain too approximate and have estimation errors which are unacceptable considering in particular the economic and financial issues surrounding deletion (which now represents a complete market).

Improving the estimation of the deleted fluid consumption E is therefore here one of the objectives of the present invention.

Figure 1:
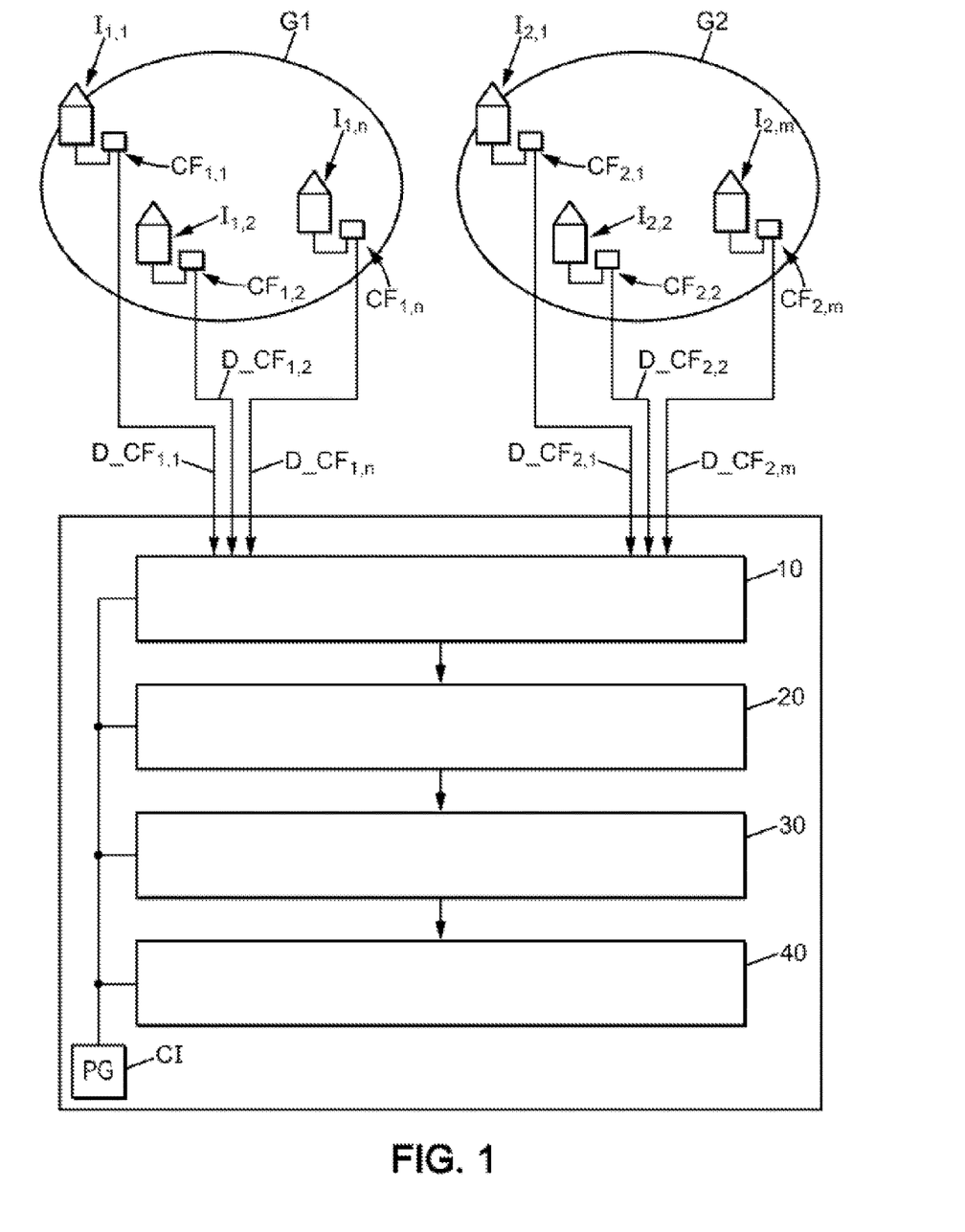
FIG. 1 shows schematically an estimation device according to a sample implementation of the present invention.

Thus in the example described here, and as shown in FIG. 1, the estimation device 100 according to the present invention comprises a collection module 10, for example a Smartmeter type automatic remote-reading equipment, which during a set learning phase Ta simultaneously collects consumption data during a first S1 and a second S2 collection steps.

More precisely, in the example described here, and as shown in FIG. 1, the collection module 10 collects, continuously or periodically, first $D\_CF_{1,1}$, $D\_CF_{1,2}$, $D\_CF_{1,n}$ and second $D\_CF_{2,1}$, $D\_CF_{2,2}$, $D\_CF_{2,m}$ consumption data. A collection done periodically at a step of 15 or 30 minutes during the learning phase T gives fully satisfactory results.

In the example described here, the first data $D\_CF_{1,1}$, $D\_CF_{1,2}$, $D\_CF_{1,n}$ comprise information about individual fluid consumption $P_{1,1}(t)$, $P_{1,2}(t)$, $P_{1,n}(t)$ of the n fluid meters $CF_{1,1}$, $CF_{1,2}$, $CF_{1,n}$ from the first group G1; and the second consumption data $D\_CF_{2,1}$, $D\_CF_{2,2}$, $D\_CF_{2,m}$ comprise information about individual fluid consumption $P_{2,1}(t)$, $P_{2,2}$ (t), $P_{2,m}$(t) from the m fluid meters $CF_{2,1}$, $CF_{2,2}$, $CF_{2,m}$ from the second group G2, where the m fluid meters $CF_{2,1}$, $CF_{2,2}$, $CF_{2,m}$ have not subscribed to the deletion service.

As shown in FIG. 1, each of the above fluid meters $CF_{1,1}$, $CF_{1,2}$, $CF_{1,n}$ and $CF_{2,1}$, $CF_{2,2}$, $CF_{2,m}$ are respectively connected to facilities $I_{1,1}$, $I_{1,2}$, $I_{1,n}$ and $I_{2,1}$, $I_{2,2}$, $I_{2,m}$, and are configured for measuring a quantity of fluid consumed by all of the equipment respectively of installation $I_{1,1}$, $I_{1,2}$, $I_{1,n}$ and $I_{2,1}$, $I_{2,2}$, $I_{2,m}$.

In the example described here, m is strictly greater than n (here m>>n); this makes it possible to obtain finer results.

The concept underlying the present invention is therefore to build a control group GC from this second group G2 of fluid meters and to do so in a way that this control group GC is closest to the behaviors of the first group G1 in terms of consumption.

Thus, in order to consistently build such a group GC and precisely estimate the deleted fluid consumption E, the present invention aims to select in the second group G2 fluid meters such that the distance between the average consumption $\overline{P_2}(t)$ thereof and the average consumption $\overline{P_1}(t)$ of the first group G1 is minimal.

Searching for this minimum distance requires the calculation of weighting coefficients $\beta_i$, where i is a positive integer included between 1 and m.

For this purpose, in the example described and as shown in FIG. 1, the estimation device 100 comprises a computer analysis module 20 which, during an analysis step S3, analyzes the first and second collected consumption data and calculates as a function of these data the weighting coefficients $\beta_i$ so as to minimize the distance between the fluid consumption of the first G1 and second G2 groups.

In the example described here, the computer analysis module 20 is configured so that the weighting coefficients $\beta_i$ are calculated so as to solve the following equation (1):

$$\underset{\beta_1 \cdots \beta_m}{\operatorname{argmin}}\left(dist\left(\overline{P_1}(t) - \sum_{j=1}^{m}\beta_j P_{2,j}(t)\right)\right)$$

in which:
  $P_{2,j}$(t) is the individual fluid consumption during the learning phase Ta of the fluid meter j belonging to the second group G2; and
  $\overline{P_1}$(t) is the average fluid consumption during the learning phase Ta of the n fluid meters $CF_{1,1}$, $CF_{1,2}$, $CF_{1,n}$ from the first group G1.

In the example described here, this is how the average fluid consumption $\overline{P_1}$(t) is calculated:

$$\overline{P_1}(t) = \frac{1}{n}\sum_{j=1}^{n}P_{1,j}(t)$$

where $P_{1,j}$(t) is the individual fluid consumption during the learning phase Ta of the fluid meter j belonging to the first group G1.

In the example described here, several approaches described above are provided in order to program the analysis module 20 in order to solve the equation (1) and calculate the weighting coefficients $\beta_i$.

In the example described here, the device 100 furthermore includes a determination (or processor) module 30 configured for making use, during a determination step 40, of the weighting coefficients $\beta_i$ calculated by the module 20 and determining the control group GC based on the second group G2, where this control group GC is a linear combination of the individual fluid consumption $P_{2,j}$(t) of the fluid meters $CF_{2,1}$, $CF_{2,2}$, $CF_{2,m}$ from the second group G2 best approaching the average fluid consumption $\overline{P_1}$(t) during the learning phase Ta of the n fluid meters $CF_{1,1}$, $CF_{1,2}$, $CF_{1,n}$ du from the first group G1:

$$\overline{P_2}(t) = \sum_{j=1}^{m}\beta_j P_{2,j}(t)$$

The calculation of weighting coefficients is characteristic of the present invention.

In order to calculate these coefficients, a first approach, already mentioned above, provides for sequential selection of fluid meters $CF_{2,1}$, $CF_{2,2}$, $CF_{2,m}$ from the second group G2.

The number of control groups GC that can be built with m fluid meters with weight "0" or "1" has order $2^m-1$ complexity. In order to reduce the number of possible subgroups, the analysis module 20 tries to reduce the distance $dist(\overline{P_1}(t)-\sum_{j=1}^{m}\beta_j P_{2,j}(t))$ by selecting sequentially, $\forall t=1, \ldots, 1$, the individual consumptions $P_{2,k}$ of the fluid meters $CF_{2,1}$, $CF_{2,2}$, $CF_{2,m}$ from the second group G2.

In this variant, the algorithm implemented in the analysis module 20 takes the following form:

Initialization at k=1:

$$S_{1,i} = dist(\overline{P_1}(t) - P_{2,i}(t))$$

$$i_1 = \underset{i=1,\ldots,m}{\operatorname{argmin}}\{S_{1,i}\}$$

$$P_{2,(1)}(t) = P_{2,i_1}(t)$$

$$\hat{S}_1 = dist(\overline{P_1}(t) - P_{2,(1)}(t))$$

Loop over k=2, . . . , m:

$$i_k = \underset{i \in \{1,\ldots m\}/\{i_1,\ldots,i_{k-1}\}}{\operatorname{argmin}}\left\{dist\left(\overline{P_1}(t) - \frac{1}{k}\left[\sum_{l=1}^{k-1}P_{2,(l)}(t) + P_{2,i}(t)\right]\right)\right\}$$

$$\hat{S}_k = dist\left(\overline{P_1}(t) - \frac{1}{k}\left[\sum_{l=1}^{k}P_{2,(l)}(t)\right]\right)$$

In this way, the set of individuals $\{i_1\} \subset \ldots \subset \{i_1, \ldots, i_k, \ldots, i_m\}$ and respective distances $\hat{S}_1, \ldots, \hat{S}_m$ is obtained, and the set of individuals $\{i_1, \ldots, i_k\}$ minimizing the distance $\hat{S}_k$ is selected.

According to this variant, the control group GC is obtained by the processor 30 which determines this group GC during the step S4 according to the following mathematical formula:

$$\overline{P_2}(t) = \frac{1}{\sum_{j=1}^{m}\beta_j}\sum_{j=1}^{m}\beta_j P_{2,j}(t)$$

where $\beta_j = \begin{cases} 1 & \text{if } i \text{ is selected} \\ 0 \end{cases} \forall t=1, \ldots, l.$ Other more effective approaches for calculating the weighting coefficients are also part of the present invention.

As stated above, it is desirable that the number of observations be limited.

Here, the explanatory variables are the load curves of the clients available for forming the control group: the number of explanatory variables m can therefore be as large as several hundred-thousands. Consequently we have m>>n.

Additionally, clients can be correlated with each other; therefore, even if m<n, then it could be that the family of explanatory variables are related, which is not possible with conventional linear regressions like those proposed in the document Navigant Consulting, "Evaluation Report: Home Energy Reports—Plan Year 4".

In order to resolve this problem, the present invention provides an approach in which the matrix of the explanatory variables is full rank.

This is possible with two large families of methods:
The constrained linear regressions of Lasso, Ridge and elastic net type and derivatives thereof.

It involves linear regression methods introducing a constraint on the norm of the model coefficients of type:

$$\|\beta\| \leq \delta, \beta \in R^m$$

with $\beta=(\beta_0, \ldots, \beta_m)$
$\|\cdot\|$ and L1 or L2 type norm or other
β is the vector of the parameters of the m+1 coefficients (one coefficient for the constant+one coefficient per variable.
Regressions on the principal components and PLS type regressions whose objective is to orthogonal lies and reduce the space of the variables. The approaches called Ridge and Lasso are going to be explained in more detail in the following.

According to the Ridge approach, solving the equation (1) above consists of doing a linear regression of the average fluid consumption of the first group G1 over the individual consumption of the second group G2 by using the L2 norm.

In the example described here, this solution of equation (1) therefore amounts to solving the minimization below:

$$\underset{\beta \in R^p}{\operatorname{argmin}} \left\| \overline{P_1}(t) - \sum_{j=1}^{m} \beta_j P_{2,j}(t) \right\|_2^2$$

with a constraint on the L2 norm of the vector β: $\|\beta\|_2 \leq \lambda$, with the parameter λ was selected by cross validation.

Alternately, a regression algorithm following the Lasso approach is implemented in the analysis computer module 20 in order to resolve the equation (1).

According to this approach, solving equation (1) amounts to solving the following minimization:

$$\underset{\beta \in R^p}{\operatorname{argmin}} \left\| \overline{P_1}(t) - \sum_{j=1}^{m} \beta_j P_{2,j}(t) \right\|_2^2$$

with a constraint on the L1 norm of the vector β: $\|\beta\|_1 \leq \tau$ where the parameter τ was selected by cross validation.

The constraint on the L1 norm has the advantage of more sparingly selecting the fluid meters (and therefore the clients) and thus reducing the bias between the control group GC and the deleted group G1.

In other words, with this constraint on the L1 norm of the vector β, more clients from the control group GC will have a weighting coefficient (or weight) equal to "0".

It is also possible to add an additional constraint on the weighting coefficients by forcing the selection of individuals whose coefficients are positive. We speak of positive Lasso constraint linear regression.

According to these various approaches using a calculation of weighting coefficients by linear regression, the control group GC is calculated by the processor 30, during the determination step 40, according to the following formula, $\forall t=1, \ldots, l$:

$$\overline{P_2}(t) = \sum_{j=1}^{m} \beta_j P_{2,j}(t)$$

In the example described here, once this group GC is determined, the estimation computer module 40 or estimator can, during an estimation step S5, estimate in real time during a deletion phase Te the deleted fluid consumption E by calculating the difference between the fluid consumption of the control group GC and the average fluid consumption of the n fluid meters $CF_{1,1}$, $CF_{1,2}$, $CF_{1,n}$ of the first group G1.

During various tests conducted that with the Lasso approach, the Applicant has demonstrated that particularly effective results can be obtained with an error rate under 8% compared to an error rate of over 10% with approaches proposed in the state-of-the-art.

Such results are made possible by building the control group from sub-daily load curves available before the event day.

This principle has the advantage of fully capturing the observable variable effects that are constant in time (e.g. location, housing type, etc.), the observable variable effects that fluctuate with time (e.g. weather) and also the unobservable variables (e.g. political opinion, ecological sensitivity, management profile, etc.).

Additionally, beyond a finer estimation of the deletion, with the present invention the effects of over estimation produced by anticipation and rebound effects caused by the consumer before and after the deletion can be avoided.

Finally, the present invention is distinguished from other approaches from the state-of-the-art by allowing a real-time estimate which adapts as time passes based on the behavior of clients, fluid consumers, and the arrival of new clients subscribing to the deletion service.

The control group constructed can also be applied to other groups in order to calculate other deletions.

The present invention has a particularly advantageous application in the estimation of deleted fluid consumption with deletions by direct control of the load, for example by the operator. Obviously, the present invention applies for all types of deletion, such as for example voluntary and one time deletion by a client for example during a rate spike.

In the example described here, all technical functionalities described above for each of the physical entities of the device 100 is driven here by a computer program PG which is recorded on a recording medium CI.

It needs to be observed that this detailed description covers a specific sample implementation of the present invention, but in no case does this description have any limiting nature on the subject matter of the invention; quite the opposite, the objective thereof is to remove any possible imprecision or any misinterpretation of the following claims.

The invention claimed is:

1. A method for estimation of a deleted fluid consumption during a deletion phase, said method implemented by computer means comprising:

during a learning phase:
a first collection step which consists of collecting first consumption data comprising information about the consumption of fluid from n fluid meters coming from a first group, where n is a positive integer and where said n fluid meters from the first group have subscribed to a deletion service;
a second collection step which consists of collecting second consumption data comprising information about the consumption of fluid from m fluid meters coming from a second group, where m is a positive integer and where said m fluid meters from the second group have not subscribed to a deletion service;
a step of analysis of the first and second collected consumption data during which weighting coefficients $\beta_i$ are calculated as a function of these first and second consumption data so as to minimize the distance between the fluid consumption of the first and second groups, where i is a positive integer included between 1 and m; and
a determination step during which a control group is determined from the second collected consumption data coming from m fluid meters from the second group and as a function of the weighting coefficients $\beta_i$ calculated during the analysis step; and during the deletion phase:
an estimation step consisting of estimating the deleted fluid consumption during a deletion phase by calculating the difference between the fluid consumption of the control group and the average fluid consumption of the n fluid meters from the first group.

2. The method according to claim 1, wherein the weighting coefficients are calculated during the analysis step so as to solve the following equation:

$$\operatorname*{argmin}_{\beta_1 \ldots \beta_m}\left(dist\left(\overline{P_1}(t) - \sum_{j=1}^{m} \beta_j P_{2,j}(t)\right)\right)$$

in which:
$P_{2,j}(t)$ is the individual fluid consumption during the learning phase of the fluid meter j belonging to the second group; and
$\overline{P_1}(t)$ is the average fluid consumption during the learning phase of the n fluid meters from the first group.

3. The method according to claim 1, wherein m is strictly greater than n.

4. The method according to claim 1, wherein, during the analysis step, the calculation of weighting coefficients comprises a sequential selection of fluid meters from the second group minimizing the distance between the fluid consumptions of the first and second groups.

5. The method according to claim 4, wherein, during the analysis step, a value of "1" is assigned to the weighting coefficient $\beta_k$ if the individual fluid consumption of the fluid meter k from the second group is selected and a value of "0" is assigned otherwise, where k is a positive integer included between 1 and m.

6. The method according to claim 4, wherein the step of determination of the control group comprises the calculation of the average fluid consumption $\overline{P_2}(t)$ of the second group as a function of the weighting coefficients, where such a calculation is preferably done according to the following mathematical formula:

$$\overline{P_2}(t) = \frac{1}{\sum_{j=1}^{m} \beta_j} \sum_{j=1}^{m} \beta_j P_{2,j}(t)$$

in which $P_{2,j}(t)$ is the individual fluid consumption during the learning phase of the fluid meter j belonging to the second group.

7. The method according to claim 1, wherein, during the analysis step, the calculation of the weighting coefficients $\beta_i$ comprises a linear regression of the average fluid consumption of the n fluid meters from the first group over the individual fluid consumption of each of the m fluid meters from the second group.

8. The method according to claim 7, wherein the linear regression is a constrained linear regression.

9. The method according to claim 7, wherein the linear regression is a Ridge type constrained linear regression.

10. The method according to claim 7, wherein the linear regression is a Lasso type constrained linear regression.

11. The method according to claim 7, wherein the linear regression is an elastic net type constrained linear regression.

12. The method according to claim 7, wherein the linear regression is of PLS or PCR type.

13. The method according to claim 7, wherein the step of determination of the control group comprises the calculation of the average fluid consumption $\overline{P_2}(t)$ of the second group as a function of the weighting coefficients, where such a calculation is preferably done according to the following mathematical formula:

$$\overline{P_2}(t) = \sum_{j=1}^{m} \beta_j P_{2,j}(t)$$

in which $\overline{P_{2,j}}(t)$ is the individual fluid consumption during the learning phase of the fluid meter j belonging to the second group.

14. The method according to claim 1, wherein the fluid consumption is an electric power representative of the consumed electric power.

15. A non-transmissible computer-readable storage medium comprising a computer program comprising instructions for executing the steps of the estimation method according to claim 1, when said computer program is executed by a computer.

16. A device for estimation of the deleted fluid consumption during the deletion phase, where said device comprises:
a collection module configured to collect:
a) first consumption data comprising information about the consumption of fluid from n fluid meters coming from a first group, where n is a positive integer and where said n fluid meters from the first group have subscribed to a deletion service; and
b) second consumption data comprising information about the consumption of fluid from m fluid meters coming from a second group, where m is a positive integer and where said m fluid meters from the second group have not subscribed to a deletion service; and a computer analysis module which is configured for calculating, as a function of the first and second consumption data, weighting coefficients $\beta_i$ minimizing the distance between the fluid consumptions of the first and second groups, where i is a positive integer included between 1 and m;

a processor configured to determine a control group from the second consumption data collected coming from m fluid meters from the second group, and as a function of said weighting coefficients $\beta_i$ calculated by the computer analysis module; and an estimation computer module configured for estimating the deleted fluid consumption during a deletion phase by calculating the difference between the fluid consumption of the control group and the average fluid consumption of the n fluid meters from the first group.

17. The device according to claim 16, further comprising computer means configured for implementation of the method for estimation of a deleted fluid consumption during a deletion phase, said method implemented by computer means comprising:

during a learning phase:
 a first collection step which consists of collecting first consumption data comprising information about the consumption of fluid from n fluid meters coming from a first group, where n is a positive integer and where said n fluid meters from the first group have subscribed to a deletion service;
 a second collection step which consists of collecting second consumption data comprising information about the consumption of fluid from m fluid meters coming from a second group, where m is a positive integer and where said m fluid meters from the second group have not subscribed to a deletion service;
 a step of analysis of the first and second collected consumption data during which weighting coefficients $\beta_i$ are calculated as a function of these first and second consumption data so as to minimize the distance between the fluid consumption of the first and second groups, where i is a positive integer included between 1 and m; and
 a determination step during which a control group is determined from the second collected consumption data coming from m fluid meters from the second group and as a function of the weighting coefficients $\beta_i$ calculated during the analysis step; and during the deletion phase:
 an estimation step consisting of estimating the deleted fluid consumption during a deletion phase by calculating the difference between the fluid consumption of the control group and the average fluid consumption of the n fluid meters from the first group.

* * * * *